(12) United States Patent
Jacob et al.

(10) Patent No.: US 7,648,419 B2
(45) Date of Patent: Jan. 19, 2010

(54) JOINT ARRANGEMENT

(75) Inventors: Werner Jacob, Frankfurt am Main (DE); Ernst-Guenter Paland, Burgwedel (DE); Renate Paland, legal representative, Burgwedel (DE)

(73) Assignee: Shaft-Form-Engineering GmbH, Muelhlheim (DE)

( * ) Notice: Subject to any disclaimer, the term of this patent is extended or adjusted under 35 U.S.C. 154(b) by 0 days.

(21) Appl. No.: 12/062,963

(22) Filed: Apr. 4, 2008

(65) Prior Publication Data

US 2008/0261707 A1    Oct. 23, 2008

Related U.S. Application Data

(63) Continuation of application No. PCT/EP2006/009508, filed on Sep. 30, 2006.

(30) Foreign Application Priority Data

Oct. 5, 2005    (DE) .................. 10 2005 047 865

(51) Int. Cl.
*F16D 3/224*    (2006.01)
(52) U.S. Cl. .................. 464/145; 464/167; 464/906
(58) Field of Classification Search ........... 464/145, 464/167, 906
See application file for complete search history.

(56) References Cited

U.S. PATENT DOCUMENTS

| 3,475,924 | A | * | 11/1969 | Aucktor | .............. 464/145 X |
|---|---|---|---|---|---|
| 6,241,617 | B1 | | 6/2001 | Jacob | |
| 6,251,021 | B1 | * | 6/2001 | Jacob | .............. 464/145 |
| 6,306,045 | B1 | | 10/2001 | Jacob | |
| 6,443,844 | B1 | * | 9/2002 | Perrow | .............. 464/145 |
| 6,582,313 | B2 | * | 6/2003 | Perrow | .............. 464/145 |
| 7,393,283 | B2 | * | 7/2008 | Jacob et al. | .............. 464/145 |
| 2003/0073503 | A1 | | 4/2003 | Perrow | |
| 2006/0166751 | A1 | | 7/2006 | Jacob et al. | |

FOREIGN PATENT DOCUMENTS

| DE | 198 31 016 A1 | 1/2000 |
|---|---|---|
| DE | 199 11 111 C1 | 1/2001 |
| DE | 102 48 372 A1 | 5/2004 |
| EP | 0 645 549 B1 | 3/1995 |
| WO | WO 03/046397 A1 | 6/2003 |
| WO | WO 2004/036076 A1 | 4/2004 |

OTHER PUBLICATIONS

International Search Report dated Dec. 11, 2006 including English translation (Six (6) pages).

* cited by examiner

*Primary Examiner*—Greg Binda
(74) *Attorney, Agent, or Firm*—Crowell & Moring LLP

(57) ABSTRACT

A joint arrangement including a constant velocity ball joint (1) which is constructed as a counter track joint, with an inner hub (4) having first inner track grooves (16) and second inner track grooves (17), and an outer hub (7) in which first outer track grooves (20) and second outer track grooves (21) are arranged on an inner surface in an alternating matter distributed around the axis of the outer hub. The joint arrangement also includes a displacement unit (12), which transmits torque and permits axial displacements along a longitudinal axis (9), and which is constructed as a roller guide unit with inner tracks 28 and outer tracks (29) extending parallel to each other.

9 Claims, 3 Drawing Sheets

JOINT ARRANGEMENT

CROSS REFERENCE TO RELATED APPLICATIONS

This application is a continuation of international patent application no. PCT/EP2006/009508, filed Sep. 30, 2006, designating the United States of America, and published in German on Apr. 12, 2007 as WO 2007/039259, the entire disclosure of which is incorporated herein by reference. Priority is claimed based on Federal Republic of Germany patent application no. DE 10 2005 047 865.4, filed Oct. 5, 2005.

BACKGROUND OF THE INVENTION

The invention relates to a joint arrangement with a constant velocity ball joint, which is constructed as a counter track joint with a drive-side end and a driven-side end, an inner hub with first internal channels and second internal track grooves, and an outer hub, on whose interior surface the first exterior channels and the second exterior track grooves are alternatively arranged, so that each time the first interior track grooves are placed opposite to the first exterior track grooves and the second interior track grooves are located opposite to the second exterior track grooves. These channels always pair up with one another and form a circular cage, which is placed between the inner hub and the outer hub, runs on the inner hub and presents a window, in which the interlocking balls are run through the channels to achieve a torque transmission. These channels also feature a plunging element or displacement unit which is designed as a mechanism of rolling elements that allows shifting movements along a longitudinal axis and produces a torque transmission on interior channels and exterior channels that extend parallel to each other.

A joint arrangement of this type is known from U.S. Pat. No. 6,241,617 (=DE 198 31 016). The displacement unit of this joint arrangement is thereby arranged inside the joint, so that the inner track grooves of the displacement unit are formed on a shaft pin or the like, while the outer track grooves of the displacement unit are provided in the inner surface of an approximately sleeve-like inner hub. Since this known joint arrangement the joint cage has an inner cage surface shaped as a hollow sphere, with which it is guided over a spherical exterior surface of the inner hub, the manufacture of the inner hub is particularly difficult and expensive. Therefore, the outer track grooves of the displacement unit must be formed on the interior surface of the inner hub, and the first and second inner track grooves of the constant velocity joint, as well as the cage guiding surface, must be formed with a high degree of precision on the exterior surface of the inner hub.

To reduce the production cost of the inner hub of such a joint arrangement, U.S. Pat. No. 6,306,045 (=DE 199 11 111) suggests arranging the displacement unit and the joint axially one behind the other on a shaft or a displacement pin. However, as a result, the required axial installation space for the installation of such a joint arrangement is significantly increased, which is detrimental for certain applications.

US patent publication no. 2006/0166751 (=DE 102 48 372) discloses a counter track joint, which comprises an inner hub and an outer hub, between which a substantially annular cage is inserted. In both the internal hub and the external hub, track grooves are formed, associated respectively with each other in pairs, in which balls, received in the cage, are displaceably retained. The track bases of the paired channels of the inner and outer hubs approach each other in alternation starting from a first end of the counter track joint toward a second end and from the second end toward the first end. The inner hub comprises two elements which interengage each other in a claw-like manner in the assembled state, which lie substantially one behind the other along the axis of the inner hub, the first of which features the first inner track grooves and the second of which features the second inner track grooves.

In this known joint, the cage is inserted into the outer hub. For this purpose, the projecting webs arranged between the outer track grooves must be configured as cage guide surfaces. The production of the cage guide surfaces and outer track grooves with a high degree of precision in the inner surface of the outer hub can lead, in some special applications, to an increased manufacturing cost.

SUMMARY OF THE INVENTION

Therefore, it is an object of this invention to provide a joint arrangement with a reduced space requirement.

A further object of the invention is to provide a joint arrangement which also can be manufactured in a simple and cost-efficient manner.

These and other objects are achieved in accordance with the present invention by providing a joint arrangement as described and claimed hereinafter.

On a joint arrangement of the type described above, the interior channels of the displacement unit should preferably be placed on the exterior surface of the outer hub. In other words, for the configuration of the joint arrangement used in this invention, the displacement unit includes the joint, which is placed in the interior of the displacement unit. Thus, both the interior channels of the displacement unit and the exterior track grooves of the joint are placed in the outer hub of the joint. For this joint arrangement, the inner hub can be manufactured in a simpler manner because we must develop only the first and the second interior track grooves as well as running surfaces for the joint cage. Moreover, a joint mechanism constructed in this way is particularly compact, so that it is also particularly suitable as an installation unit in universal joints or cardan shafts of motor vehicles.

At the same time, the interior track grooves are arranged alternately on the exterior surface of the inner hub around the inner hub axle, whereby, according to the invention, the inner hub contains at least two claw-like mutually interlocked elements placed in an assembled position, which primarily lie one behind the other on the inner hub axle, and on which the first element features the first interior track grooves and a second element displays the second interior track grooves. This simplifies the installation of the joint, according to the invention, since the cage can be simply plugged or swung into the outer hub. In this position, whole balls can be inserted into the window of the cage and of the exterior track grooves, and they can be secured there, for example, with grease. Both elements of the inner hub can be then introduced from opposite ends of the joint into the outer hub and into the cage and they can be connected together. Consequently, it is no longer necessary to insert the balls individually in the window of the cage by overbending the joint.

According to one preferred embodiment of the invention, to facilitate the insertion of both elements of the inner hub into the cage, the joint cage first displays insertion surfaces on its interior surface, that run from the driven-side end toward the drive-side end, without indentations; second, it presents insertion surfaces that run from the drive-side end toward the driven-side end, without indentations, which are constructed in such a way that the claw-like mutually interlocking elements of the inner hub can be driven into the cage from the opposite ends and can be bonded together inside.

In order to center the cage as well as the balls of the constant velocity joint in their resting state, the two elements of the inner hub comprise first and second cage centering surfaces, preferably adjacent the first and second inner track grooves, for guiding first and second guide surfaces which are provided on the inner hub of the cage adjacent the insertion surfaces.

In a further embodiment of the inventive concept, the two elements of the inner hub, which interengage each other in a claw-line manner in the assembled state, are formed by respective cylindrical sections from which shell-shaped protrusions extend, which each form an inner track groove and a cage-centering surface. The cylindrical sections of both elements of the inner hub thereby preferably lie substantially one behind the other along the axis of the inner hub. To enable the two elements to mutually interlock in a claw-like manner, recesses constructed corresponding in size and shape to the shell-shaped protrusions of one element are provided in the other element. Thus, the two elements that form the inner hub contact each other in an interlocking manner in the tangential direction.

The assembly of the joint of the joint arrangement according to the invention can be further simplified by the cage having a spherical exterior surface in areas, which is flattened in the window regions in such a manner that the exterior diameter of the cage is less than or equal to the inner diameter of the outer hub. In this way the cage can be inserted coaxially in the outer hub without deforming it.

If both elements that form the inner hub are bolted together, a good axial connection between these two elements can also be assured. For this purpose, one of the elements that forms the inner hub is provided, for example, with a central through-hole, while the other element has a threaded hole coaxial to this through-hole. This makes it possible to connect these two elements via a threaded bolt.

According to one preferred embodiment of the invention, both elements of the inner hub and/or the outer hub, in which the inner track grooves of the displacement unit as well as the outer track grooves of the joint are formed, comprise chiplessly machined, massively formed parts. The cage can also be produced this way in accordance with the invention. This facilitates production of these components with especially high precision. Thus the track grooves and the interengaging projections and recesses of the two elements can be formed with high precision and uniformly high quality, for example, by a stamping or embossing process. However, it is fundamentally also possible to carry out individual process steps, such as the provision of the through-hole as well as the threaded hole necessary for connecting the two elements, in a chip-forming machining operation. Likewise, it may be advisable for limited series, if both elements of the inner hub and/or the outer hub are produced by casting or a chip-forming machining process.

A particularly compact construction of the joint arrangement can be achieved if there are six track grooves each in the outer and inner hubs of the joint. However, it is also possible to construct the joint of the joint arrangement of the invention with four, eight, or more groove pairs. The number of groove pairs of the joint preferably should equal to the number of channel pairs of the displacement unit. Therefore, in accordance with one preferred embodiment of the invention, the outer hub can be configured in such a way that the inner track grooves of the displacement unit are each arranged between a first and a second outer track groove of the joint. As a result, it becomes possible to achieve a particularly uniform wall thickness throughout the outer hub. This is advantageous both for the deformation and the hardening of the outer hub.

As a constant velocity ball joint, the joint arrangement according to the invention can comprise a small angle joint with a maximum bending angle between the inner hub and the outer hub of approximately ±24°. However, the configuration of the joint also enables greater bending angles between the inner hub and the outer hub of, for example, approximately ±40°. Thus, the joint arrangement can, for example, also be utilized for greater bending angles as a steering joint in a side shaft.

Preferably, at least two balls received in an axially displaceable outer cage are provided in each pair of track grooves in the displacement unit. A tilting or canting of the displacement unit can be effectively avoided by introducing two balls into the outer cage. However, it is also possible to provide a greater number of balls in the displacement unit, for example, when this is necessary for the torque transmission.

In order to prevent the balls from falling out of the displacement unit, or to limit the maximum displacement path of the displacement unit, it is preferable if corresponding stop means or the like are associated with the balls and/or the outer cage. Thus, for example, a protrusion extending into the inner track grooves of the displacement unit can be provided on the outer hub, which would limit the displacement path of the balls. A tipping of the displacement unit relative to the joint can be effectively prevented if the ratio of the spacing between the two contact points of a ball in a channel to the spacing between two adjacent balls in the channel pair amounts to at least 1:3. An even better protection against tilting of the displacement unit can be achieved, for example, by a ratio of 1:4 or 1:5. The spacing of the balls in the channel is thereby determined as the spacing between the centers of the balls.

The outer track grooves of the displacement unit can be constructed in a sleeve or bell formed from a tube or a rounded metal sheet, which preferably is provided or connected with a connector for a shaft or a shaft pin. The joint arrangement according to the invention is particularly suited for installation in a longitudinal shaft or side shaft as a drive shaft in a motor vehicle, and due to its compact dimensions, it can also be provided as a pre-assembled modular unit.

The following description of working embodiments and the drawings provide additional information about the possibilities to further develop this invention, its advantages, and its potential applications. Thus, all the individual features or optional combinations of features described in writing or graphically illustrated constitute subject matter of the invention, regardless of their being compiled in the claims or referred to in the claims.

BRIEF DESCRIPTION OF THE DRAWING

The invention will be described in further detail hereinafter with referent to illustrative preferred embodiments shown in the accompanying drawing figures, in which.

DETAILED DESCRIPTION OF PREFERRED EMBODIMENTS

Figure 1:
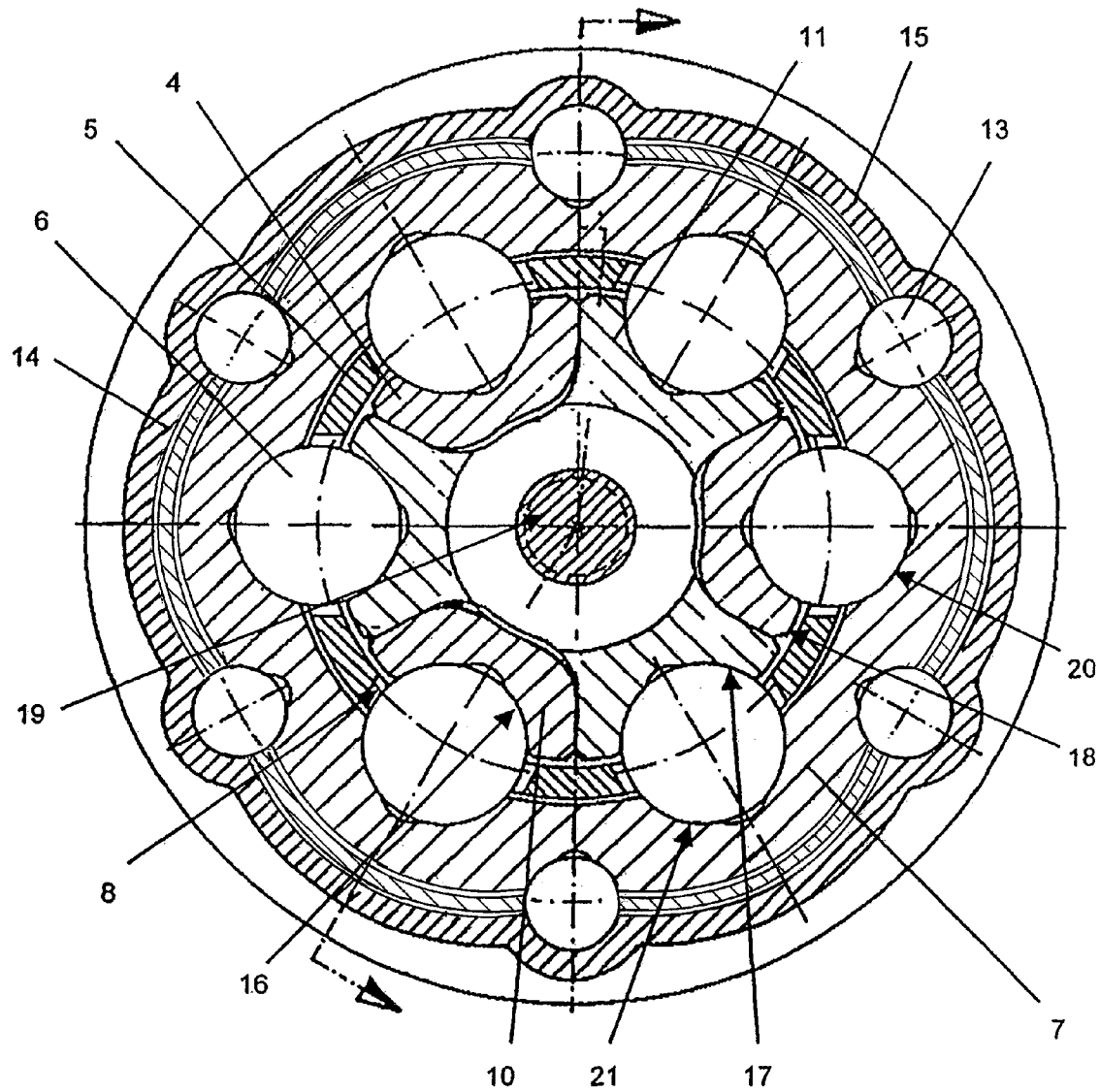
FIG. 1 is a sectional view of a joint arrangement according to the invention.

In the joint arrangement shown in the Figures, the constant velocity ball joint 1 has a first, drive-side end 2 and a second driven-side or output end 3, whereby the terms "drive-side" and "driven-side" are used solely in an illustrative manner to better distinguish the two ends. It should be understood, however, that both ends are suitable in the same way for connection to a drive source or to a driven component.

The constant velocity ball joint comprises, in a known manner, an inner hub 4, a (joint) cage 5, which is equipped with balls or rollers 6, and an outer hub 7. The balls 6 are thereby received in windows 8 of the cage 5.

Figure 2:
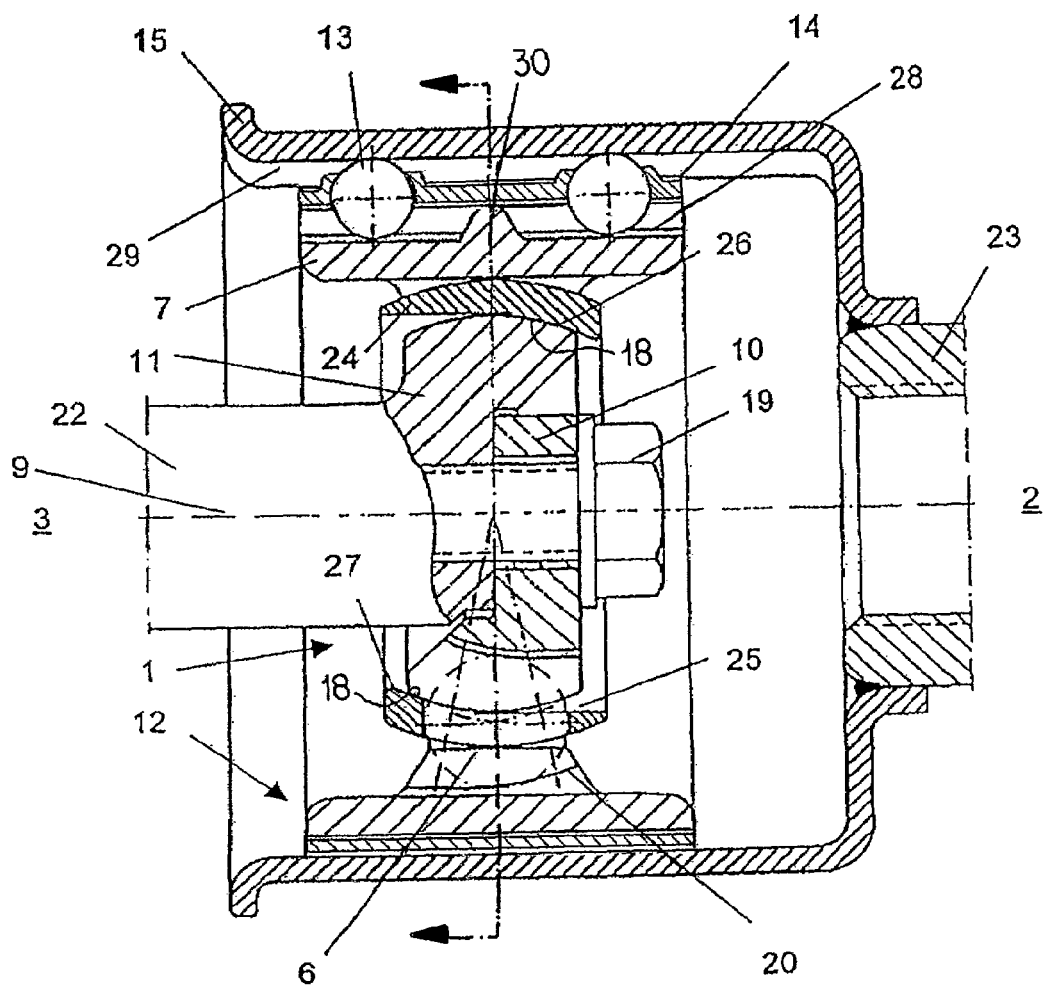
FIG. 2 is a sectional view of the joint arrangement taken along line B-B of FIG. 1.

As can be seen, in particular, from FIGS. 1 and 2, the inner hub 4 is constructed in two parts. A first element 10 and a second element 11 are arranged substantially one behind the other on the central inner hub axle 9. The two elements 10 and 11 which form the inner hub 4 are alternately provided with protrusions and recesses, which interengage with each other in a claw-like manner. The protrusions of the two elements thereby contact each other in an interlocking manner in the tangential direction. Both the protrusions and the recesses can thereby have a partly circular configuration.

Further, the joint arrangement is provided with a displacement unit 12, which surrounds the constant velocity ball joint 1. The displacement unit 12 comprises a plurality of balls 13, which are introduced into windows of an outer cage 14, as well as a bell 15, which surrounds the balls 13 of the displacement unit 12 as well as the constant velocity ball joint 1.

A first inner track groove 16 is formed in each of the protrusions of the first element 10 of the inner hub 4, while second inner track grooves 17 are provided in the protrusions of the second element 11 of the inner hub 4. The first inner track grooves 16 thereby extend without any undercuts starting from the drive-side end 2 toward the driven-side end 3. Its track base thereby approaches the inner hub axle 9. In contrast, the second inner track grooves 17 of the element extend without any undercuts starting from the driven-side end 3 toward the drive-side end 2, whereby its track base approaches the inner hub axle 9. First and second cage-centering surfaces 18 are formed adjacent the inner track grooves 16 and 17, respectively, on the protrusions of the inner hub 4. The cage-centering surfaces 18 together form a regionally spherical surface, by which the cage is guided in the inner hub 4. As can be seen, in particular, from FIG. 2, the two elements 10 and 11, which form the inner hub 4, are connected together axially by a screw connection via a threaded bolt 19.

The outer hub 7 is a one-piece, sleeve-like component, whose axis in the extended position of the constant velocity ball joint coincides with the inner hub axle 9 of the inner hub 4. First and second outer track grooves 20 and 21, respectively, are formed on the inner surface of the outer hub 7, which are arranged distributed regularly and alternatingly around the axis of the outer hub. In the completely assembled state of the constant velocity ball joint, the first inner track grooves 16 of the inner hub 4 lie opposite the first outer track grooves 20 of the outer hub 7, and the second inner track grooves 17 lie opposite the second outer track grooves 21, so that these form respective pairs of track grooves with each other. A ball 6 retained in a cage 5 is disposed in each of these track groove pairs. The first outer track grooves 20 of the outer hub 7 extend without any undercuts starting from the drive side end 2 toward the driven-side end 3, whereby their track bottoms move away from the outer hub axis. In contrast, the second outer track grooves 21 extend without any undercuts starting from the driven-side end 3 toward the drive side end 2, whereby their track base likewise moves away from the axis of the outer hub.

Figure 4:
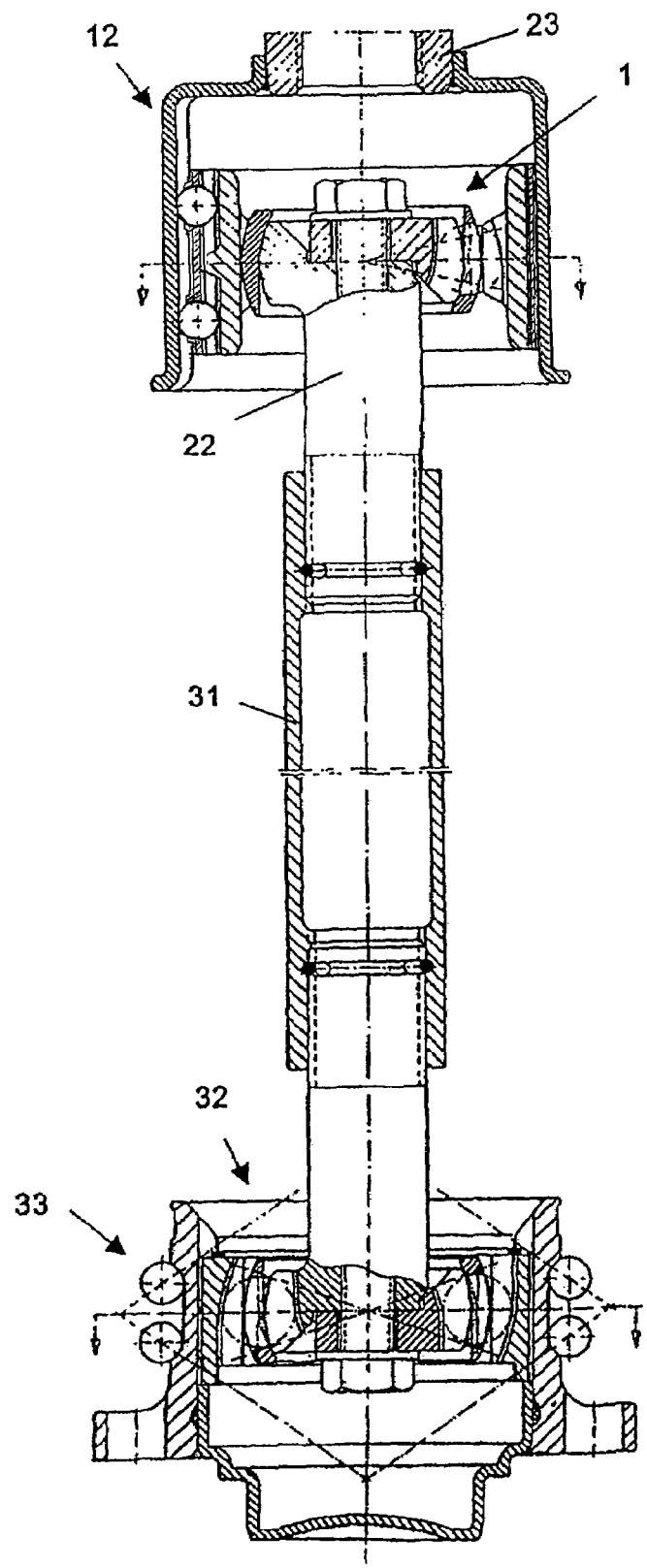
FIG. 4 is a sectional view of a side shaft with a joint arrangement according to the invention.

As can be seen, in particular, from FIG. 4, the second element 11 of the inner hub 4 is constructed in one piece with a shaft pin 22 for connecting the constant velocity ball joint 1. Alternatively, the element 11 of the inner hub 4 also can be constructed, for example, as a sleeve with internal profiling. In the embodiment shown in FIG. 2, the bell 15 of the displacement unit 12 is connected to a sleeve 23 with internal profiling in which a correspondingly profiled shaft end can be inserted in order to transmit torque. Alternatively, the bell 15 can also be provided with or connected to any other desired connecting means.

In the illustrated working embodiment, the (joint) cage 5 is formed by a one-piece, closed ring, in which the cage windows 8 are provided. On the inner surface of the cage 5, there are first insertion surfaces 24 that extend without any undercuts starting from the driven-side end 3 toward the drive-side end 2, and second insertion surfaces 25 that extend without any undercuts starting from the drive-side end 2 towards the driven-side end 3. In the illustrated embodiment, the insertion surfaces 24 and 25 are configured as surfaces extending at least approximately parallel to the axis, so that the elements 10 and 11, which form the inner hub 4, can be inserted into the cage 5 from opposite ends, without any hindrance from the spherically configured cage-centering surfaces 18.

First guide surfaces 26, with spherically configured regions, are provided adjacent the insertion surfaces 24 axially behind the first insertion surfaces 24, i.e., on the drive-side end 2 of the cage 5. Correspondingly, on the driven-side end 3 of the cage 5, adjacent the second insertion surfaces 25, second guide surfaces 27 are formed, which are likewise spherically configured in regions. As can be seen from the illustration in FIG. 2, the spherical cage-centering surfaces 18 of the first element 10 thus lie against the second guide surfaces 27 of the cage 5, while the second cage-centering surfaces 18 of the second element 11 lie against the first guide surfaces 26 of the cage 5. In this way, the cage 5 is centered in the constant velocity ball joint 1 when the joint 1 is in a resting state.

The assembly of the constant velocity ball joint 1 will now be explained as follows. In order to assemble the joint 1, the cage 5 must first be introduced into the outer hub 7, whereby the outer surface of the cage 5, at least in the area of the cage window 8, is flattened in such a manner that the outer diameter of the cage 5 is smaller than or equal to the interior diameter of the outer hub 7. The cage 5 consequently be inserted, both from the drive-side end 2 as well as from the driven-side end 3, into a position in the outer hub 7 in which the axes of the outer hub 7 and of the cage 5 coincide.

Now all the balls 6 can be inserted from the inside into the windows 8 of the cage 5 and the outer track grooves 20 and 21, respectively, of the outer hub 7. For this purpose, the balls 6 optionally may be held in the cage 5 and the outer hub 7 with lubricating grease or the like.

If all balls 6 have been received in the cage 5 and the outer hub 7, the inner hub 4 can be inserted into the constant velocity ball joint 1, in that the first element 10 is inserted into the cage 5 from the drive-side end 2, while the second element 11 is inserted into the cage 5 from the driven-side end 3 and is connected to the first element 10 in a claw-like manner. The protrusions of both elements 10 and 11 thereby each engage in the recesses of the respective other element. To axially secure the two elements, the threaded bolt 19 is inserted through the through-hole provided in the first element 10 and screwed into the threaded hole provided in the second element 11.

The insertion of the two elements 10 and 11, respectively, in the cage 5 is possible only in the position in which the protrusions of both elements are aligned to the insertion surfaces 24 and 25, respectively, on the inner surface of the cage 5. The two elements can thereby be inserted into the cage 5 and connected interlockingly with each other until the cage centering surfaces 18 of the two element engage the guide surfaces 26 and 27 of the cage 5.

Furthermore, in the outer surface of the outer hub 7, inner tracks 28 are provided which extend parallel to each other and parallel to axis of the outer hub. As can be seen from the sectional view of FIG. 1, the inner tracks 28 are arranged offset from the outer track grooves 20 and 21, so that the inner tracks 28 are each positioned between a first outer track groove 20 and a second outer track groove 21. As a result, the outer hub 7 has a substantially uniform wall thickness.

In a similar manner, outer tracks 29 are formed in the bell 15, which likewise extend parallel to each other, and when the displacement unit 12 is in the assembled state, also extend parallel to the axis of the outer hub. The inner tracks 28 and the outer tracks 29 are associated with each other in pairs, whereby in each track pair of the working embodiment shown in FIG. 2, two balls 13 are provided guided in the outer cage 14. To prevent the balls 13 or the outer cage 14 from dropping out, a protruding end stop 30 is provided in the inner track 28 between the two balls 13, which limits the displacement of the balls. Alternately, the displacement path can also be limited by corresponding end stops at the ends of the inner and/or outer tracks.

Figure 3:
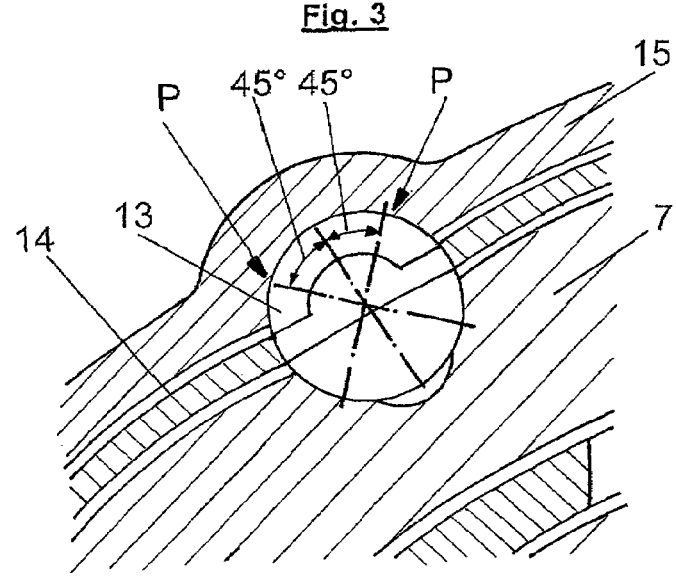
FIG. 3 is an enlarged detail view of a section from FIG. 1.

To prevent the displacement unit 12 from tilting, the spacing between the two balls 13 must be selected so that it is sufficiently large. For this purpose, the spacing between the centers of the balls 13, which are received in the same track pair, should be at least three times as large as the spacing between the two contact points P (shown in FIG. 3) of the balls 13 in the tracks. In the working embodiment shown in FIG. 2, the spacing between the centers of the two balls 13 is approximately four times larger than the spacing between the two contact points P. Alternatively to what is shown in FIG. 2, more than two balls 13 also can be arranged in each track pair of the displacement unit 12. In this situation, the spacing between the outer balls 13 amounts to at least three times the spacing between the contact points P.

In FIG. 4, the joint arrangement described above is shown as a component of a side shaft of a motor vehicle. For this purpose, the shaft pin 22 of the constant velocity ball joint 1 is connected through a hollow shaft 31 to a steering joint 32, which is pivotably mounted on schematically illustrated wheel bearings 33. The construction of the steering joint 32 thereby substantially corresponds to that of the constant velocity ball joint 1 described above.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A joint arrangement comprising a longitudinal displacement unit and a counter track joint, wherein said longitudinal displacement unit is arranged radially outside said counter track joint, said counter track joint is a constant velocity joint with a drive-side end and a driven-side end; said counter track joint including an inner hub with first inner track grooves and second inner track grooves, an outer hub having an inner surface with first outer track grooves and second outer track grooves arranged distributed alternately around the outer hub axis, said first inner track grooves and said first outer track grooves, and said second inner track grooves and said second outer track grooves, respectively, being disposed opposite each other to form first and second track groove pairs; and an annular cage disposed between said inner hub and said outer hub and guided on said inner hub, said annular cage having windows which hold rollers engaged in the track grooves for transmitting torque, said longitudinal displacement unit is constructed as a roller guide arrangement with inner and outer roller guide tracks extending parallel to each other in opposing pairs, said roller guide arrangement serving to transmit torque and permitting displacement movements along a longitudinal axis, and an outer cage located radially outside of said outer hub for control of roller separation, said one-piece outer cage being axially displaceable, at least two balls, received in said outer cage, are provided in each track pair of said longitudinal displacement unit, and said at least two balls or said outer cage of said longitudinal displacement unit exhibit a maximum displacement which is limited by a stop member, said stop member being formed on an outer surface of the outer hub;

the inner guide tracks of the displacement unit are formed on an outer surface of the outer hub, and the inner track grooves are formed on the outer surface of the inner hub distributed alternately around the inner hub axis, wherein the inner hub in an assembled state comprises first and second mutually interlocking elements located substantially one behind the other along the inner hub axis, the first inner track grooves are disposed on said first element and the second inner track grooves are disposed on said second element;

the cage of the joint is provided on its inner surface with first insertion surfaces extending without undercuts from the driven-side end toward the drive-side end and second insertion surfaces extending without undercuts from the drive-side end toward the driven-side end, said first and second insertion surfaces being configured to permit the mutually interlocking elements of the inner hub to be inserted into the cage from opposite ends and connected to each other;

the elements of the inner hub have first and second centering surfaces adjacent the first and second inner track grooves, said first and second centering surfaces guiding first and second guide surfaces which are provided adjacent the insertion surfaces on the inner surface of the cage;

the elements of the inner hub each comprise a cylindrical section from which protrusions extend, each of which forms an inner track groove and a cage centering surface, and the first inner track grooves extend without any undercuts starting from said drive-side end towards said driven-side end, whereby its track base approaches the inner hub axis, and the second inner track grooves extend without any undercuts starting from said driven-side end towards said drive-side end, whereby its track base approaches said inner hub axis.

2. A joint arrangement as claimed in claim 1, wherein the cage has an outer surface with spherically configured regions, which is flattened at least in the window areas such that the outer diameter of the cage is smaller that or equal to the inner diameter of the outer hub.

3. A joint arrangement as claimed in claim 1, wherein the outer hub or the two elements of the inner hub are chiplessly machined massively formed parts.

4. A joint arrangement as claimed in claim 1, wherein the number of track groove pairs in the joint is six.

5. A joint arrangement as claimed in claim 1, wherein the number of track groove pairs in the joint is equal to the number of track guide pairs in the displacement unit.

6. A joint arrangement as claimed in claim 1, wherein the joint has a maximum bending angle between the inner hub and the outer hub of about ±40°.

7. A joint arrangement as claimed in claim 1, wherein each of the at least two balls in a track pair contacts the outer track at two spaced points, and the spacing between the at least two balls in a track is at least three time the spacing between said two spaced points.

8. A joint arrangement as claimed in claim 1, wherein the outer tracks of the displacement unit are disposed in a sleeve or bell formed from a tube or a curved metal sheet, and wherein said sleeve or bell is provided with a connector for a shaft or shaft pin.

9. In a drive shaft for a motor vehicle, the improvement comprising a joint arrangement as claimed in claim 1

.

* * * * *